US012809870B2

United States Patent

Vaishnav et al.

(12) United States Patent
(10) Patent No.: US 12,809,870 B2
(45) Date of Patent: Nov. 24, 2026

(54) MULTI-CONTEXT STATEFUL RULE EXECUTION

(71) Applicant: Salesforce, Inc., San Francisco, CA (US)

(72) Inventors: Parth Vijay Vaishnav, San Francisco, CA (US); Mitchell Christensen, San Francisco, CA (US); Kevin Han, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 210 days.

(21) Appl. No.: 18/082,002

(22) Filed: Dec. 15, 2022

(65) Prior Publication Data

US 2024/0168957 A1 May 23, 2024

Related U.S. Application Data

(63) Continuation of application No. 17/993,795, filed on Nov. 23, 2022, now Pat. No. 12,235,849.

(51) Int. Cl.
*G06F 16/2455* (2019.01)
*G06F 16/27* (2019.01)

(52) U.S. Cl.
CPC ...... *G06F 16/24564* (2019.01); *G06F 16/273* (2019.01)

(58) Field of Classification Search
CPC ......................... G06F 16/24564; G06F 16/273
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Drools, "Drools 8.29.0 Final has been released", https://www.drools.org/ pp. 1-4, Oct. 12, 2022.

(Continued)

*Primary Examiner* — Christopher J Raab
(74) *Attorney, Agent, or Firm* — Nicholson De Vos Webster & Elliott LLP

(57) ABSTRACT

A rules engine (RE) may operate in conjunction with a database providing functionality, such as transactional support in data access environments on behalf of tenants. The database may have a data repository accessible by multiple tenants, and tenants may have a private context. RE rules may be defined in the data repository having an extension point corresponding to an extension defined in the private context. Execution of database functionality may affect data defined in the database. Execution of RE rules corresponding to database functionality affects corresponding data associated with the RE. Various techniques, e.g., fact handles, event listeners, etc. may be used to coordinate tracking and synchronizing changes between RE data and/or the database. A flag or other indicator may signify state preservation between multiple calls to the database and/or the RE, e.g., to support analysis involving transactions having overlapping intermediary results such as results from performing data lookups.

20 Claims, 5 Drawing Sheets

(56) References Cited

U.S. PATENT DOCUMENTS

| | | | | |
|---|---|---|---|---|
| 5,761,419 | A | 6/1998 | Schwartz et al. | |
| 5,819,038 | A | 10/1998 | Carleton et al. | |
| 5,821,937 | A | 10/1998 | Tonelli et al. | |
| 5,831,610 | A | 11/1998 | Tonelli et al. | |
| 5,873,096 | A | 2/1999 | Lim et al. | |
| 5,918,159 | A | 6/1999 | Fomukong et al. | |
| 5,963,953 | A | 10/1999 | Cram et al. | |
| 5,983,227 | A | 11/1999 | Nazem et al. | |
| 6,092,083 | A | 7/2000 | Brodersen et al. | |
| 6,161,149 | A | 12/2000 | Achacoso et al. | |
| 6,169,534 | B1 | 1/2001 | Raffel et al. | |
| 6,178,425 | B1 | 1/2001 | Brodersen et al. | |
| 6,189,011 | B1 | 2/2001 | Lim et al. | |
| 6,216,133 | B1 | 4/2001 | Masthoff | |
| 6,216,135 | B1 | 4/2001 | Brodersen et al. | |
| 6,233,617 | B1 | 5/2001 | Rothwein et al. | |
| 6,236,978 | B1 | 5/2001 | Tuzhilin | |
| 6,266,669 | B1 | 7/2001 | Brodersen et al. | |
| 6,288,717 | B1 | 9/2001 | Dunkle | |
| 6,295,530 | B1 | 9/2001 | Ritchie et al. | |
| 6,324,568 | B1 | 11/2001 | Diec et al. | |
| 6,324,693 | B1 | 11/2001 | Brodersen et al. | |
| 6,336,137 | B1 | 1/2002 | Lee et al. | |
| D454,139 | S | 3/2002 | Feldcamp et al. | |
| 6,367,077 | B1 | 4/2002 | Brodersen et al. | |
| 6,393,605 | B1 | 5/2002 | Loomans | |
| 6,405,220 | B1 | 6/2002 | Brodersen et al. | |
| 6,411,949 | B1 | 6/2002 | Schaffer | |
| 6,434,550 | B1 | 8/2002 | Warner et al. | |
| 6,446,089 | B1 | 9/2002 | Brodersen et al. | |
| 6,535,909 | B1 | 3/2003 | Rust | |
| 6,549,908 | B1 | 4/2003 | Loomans | |
| 6,553,563 | B2 | 4/2003 | Ambrose et al. | |
| 6,560,461 | B1 | 5/2003 | Fomukong et al. | |
| 6,574,635 | B2 | 6/2003 | Stauber et al. | |
| 6,577,726 | B1 | 6/2003 | Huang et al. | |
| 6,601,087 | B1 | 7/2003 | Zhu et al. | |
| 6,604,117 | B2 | 8/2003 | Lim et al. | |
| 6,604,128 | B2 | 8/2003 | Diec et al. | |
| 6,609,150 | B2 | 8/2003 | Lee et al. | |
| 6,621,834 | B1 | 9/2003 | Scherpbier et al. | |
| 6,654,032 | B1 | 11/2003 | Zhu et al. | |
| 6,665,648 | B2 | 12/2003 | Brodersen et al. | |
| 6,665,655 | B1 | 12/2003 | Warner et al. | |
| 6,684,438 | B2 | 2/2004 | Brodersen et al. | |
| 6,711,565 | B1 | 3/2004 | Subramaniam et al. | |
| 6,724,399 | B1 | 4/2004 | Katchour et al. | |
| 6,728,702 | B1 | 4/2004 | Subramaniam et al. | |
| 6,728,960 | B1 | 4/2004 | Loomans et al. | |
| 6,732,095 | B1 | 5/2004 | Warshavsky et al. | |
| 6,732,100 | B1 | 5/2004 | Brodersen et al. | |
| 6,732,111 | B2 | 5/2004 | Brodersen et al. | |
| 6,754,681 | B2 | 6/2004 | Brodersen et al. | |
| 6,763,351 | B1 | 7/2004 | Subramaniam et al. | |
| 6,763,501 | B1 | 7/2004 | Zhu et al. | |
| 6,768,904 | B2 | 7/2004 | Kim | |
| 6,772,229 | B1 | 8/2004 | Achacoso et al. | |
| 6,782,383 | B2 | 8/2004 | Subramaniam et al. | |
| 6,804,330 | B1 | 10/2004 | Jones et al. | |
| 6,826,565 | B2 | 11/2004 | Ritchie et al. | |
| 6,826,582 | B1 | 11/2004 | Chatterjee et al. | |
| 6,826,745 | B2 | 11/2004 | Coker | |
| 6,829,655 | B1 | 12/2004 | Huang et al. | |
| 6,842,748 | B1 | 1/2005 | Warner et al. | |
| 6,850,895 | B2 | 2/2005 | Brodersen et al. | |
| 6,850,949 | B2 | 2/2005 | Warner et al. | |
| 6,907,566 | B1 | 6/2005 | McElfresh et al. | |
| 7,062,502 | B1 | 6/2006 | Kesler | |
| 7,069,231 | B1 | 6/2006 | Cinarkaya | |
| 7,069,497 | B1 | 6/2006 | Desai | |
| 7,100,111 | B2 | 8/2006 | McElfresh et al. | |
| 7,181,758 | B1 | 2/2007 | Chan | |
| 7,269,590 | B2 | 9/2007 | Hull et al. | |
| 7,289,976 | B2 | 10/2007 | Kihneman et al. | |
| 7,340,411 | B2 | 3/2008 | Cook | |
| 7,356,482 | B2 | 4/2008 | Frankland et al. | |
| 7,373,599 | B2 | 5/2008 | McElfresh et al. | |
| 7,401,094 | B1 | 7/2008 | Kesler | |
| 7,406,501 | B2 | 7/2008 | Szeto et al. | |
| 7,412,455 | B2 | 8/2008 | Dillon | |
| 7,454,509 | B2 | 11/2008 | Boulter et al. | |
| 7,508,789 | B2 | 3/2009 | Chan | |
| 7,599,935 | B2 | 10/2009 | La Rotonda et al. | |
| 7,603,331 | B2 | 10/2009 | Tuzhilin et al. | |
| 7,603,483 | B2 | 10/2009 | Psounis et al. | |
| 7,620,655 | B2 | 11/2009 | Larsson et al. | |
| 7,644,122 | B2 | 1/2010 | Weyer et al. | |
| 7,668,861 | B2 | 2/2010 | Steven | |
| 7,698,160 | B2 | 4/2010 | Beaven et al. | |
| 7,730,478 | B2 | 6/2010 | Weissman | |
| 7,747,648 | B1 | 6/2010 | Kraft et al. | |
| 7,779,039 | B2 | 8/2010 | Weissman et al. | |
| 7,779,475 | B2 | 8/2010 | Jakobson et al. | |
| 7,827,208 | B2 | 11/2010 | Bosworth et al. | |
| 7,853,881 | B1 | 12/2010 | Aly Assal et al. | |
| 7,945,653 | B2 | 5/2011 | Zukerberg et al. | |
| 8,005,896 | B2 | 8/2011 | Cheah | |
| 8,014,943 | B2 | 9/2011 | Jakobson | |
| 8,015,495 | B2 | 9/2011 | Achacoso et al. | |
| 8,032,297 | B2 | 10/2011 | Jakobson | |
| 8,073,850 | B1 | 12/2011 | Hubbard et al. | |
| 8,082,301 | B2 | 12/2011 | Ahlgren et al. | |
| 8,095,413 | B1 | 1/2012 | Beaven | |
| 8,095,531 | B2 | 1/2012 | Weissman et al. | |
| 8,095,594 | B2 | 1/2012 | Beaven et al. | |
| 8,103,611 | B2 | 1/2012 | Tuzhilin et al. | |
| 8,150,913 | B2 | 4/2012 | Cheah | |
| 8,209,308 | B2 | 6/2012 | Rueben et al. | |
| 8,209,333 | B2 | 6/2012 | Hubbard et al. | |
| 8,275,836 | B2 | 9/2012 | Beaven et al. | |
| 8,457,545 | B2 | 6/2013 | Chan | |
| 8,484,111 | B2 | 7/2013 | Frankland et al. | |
| 8,490,025 | B2 | 7/2013 | Jakobson et al. | |
| 8,504,945 | B2 | 8/2013 | Jakobson et al. | |
| 8,510,045 | B2 | 8/2013 | Rueben et al. | |
| 8,510,664 | B2 | 8/2013 | Rueben et al. | |
| 8,566,301 | B2 | 10/2013 | Rueben et al. | |
| 8,646,103 | B2 | 2/2014 | Jakobson et al. | |
| 9,740,743 | B2 | 8/2017 | Jagota et al. | |
| 10,095,800 | B1 * | 10/2018 | Yalamanchi | G06F 16/972 |
| 10,152,497 | B2 | 12/2018 | Doan et al. | |
| 10,235,476 | B2 | 3/2019 | Vaishnav et al. | |
| 10,237,336 | B2 | 3/2019 | Dvinov et al. | |
| 10,387,388 | B2 | 8/2019 | Doan et al. | |
| 10,733,613 | B2 | 8/2020 | Vaishnav et al. | |
| 10,901,996 | B2 | 1/2021 | Doan et al. | |
| 10,949,395 | B2 | 3/2021 | Doan et al. | |
| 11,138,222 | B2 | 10/2021 | Semlani et al. | |
| 11,244,238 | B2 | 2/2022 | Jagota et al. | |
| 11,256,690 | B2 | 2/2022 | Dvinov et al. | |
| 11,442,989 | B2 | 9/2022 | Dvinov et al. | |
| 11,698,891 | B2 * | 7/2023 | Tselikis | H04L 51/04<br>707/741 |
| 11,748,320 | B2 | 9/2023 | Hersans et al. | |
| 11,790,414 | B2 | 10/2023 | Christensen et al. | |
| 11,798,044 | B2 | 10/2023 | Christensen et al. | |
| 2001/0044791 | A1 | 11/2001 | Richter et al. | |
| 2002/0072951 | A1 | 6/2002 | Lee et al. | |
| 2002/0082892 | A1 | 6/2002 | Raffel et al. | |
| 2002/0129352 | A1 | 9/2002 | Brodersen et al. | |
| 2002/0140731 | A1 | 10/2002 | Subramaniam et al. | |
| 2002/0143997 | A1 | 10/2002 | Huang et al. | |
| 2002/0162090 | A1 | 10/2002 | Parnell et al. | |
| 2002/0165742 | A1 | 11/2002 | Robbins | |
| 2003/0004971 | A1 | 1/2003 | Gong | |
| 2003/0018705 | A1 | 1/2003 | Chen et al. | |
| 2003/0018830 | A1 | 1/2003 | Chen et al. | |
| 2003/0066031 | A1 | 4/2003 | Laane et al. | |
| 2003/0066032 | A1 | 4/2003 | Ramachandran et al. | |
| 2003/0069936 | A1 | 4/2003 | Warner et al. | |
| 2003/0070000 | A1 | 4/2003 | Coker et al. | |
| 2003/0070004 | A1 | 4/2003 | Mukundan et al. | |
| 2003/0070005 | A1 | 4/2003 | Mukundan et al. | |
| 2003/0074418 | A1 | 4/2003 | Coker et al. | |

(56) References Cited

U.S. PATENT DOCUMENTS

2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2008/0249972 A1 10/2008 Dillon
2009/0063415 A1 3/2009 Chatfield et al.
2009/0100342 A1 4/2009 Jakobson
2009/0177744 A1 7/2009 Marlow et al.
2011/0218958 A1 9/2011 Warshavsky
2011/0247051 A1 10/2011 Bulumulla
2012/0042218 A1 2/2012 Cinarkaya
2012/0173589 A1* 7/2012 Kwon .................. G06F 16/211 707/E17.005
2012/0233137 A1 9/2012 Jakobson et al.
2012/0290407 A1 11/2012 Hubbard et al.
2013/0212497 A1 8/2013 Zelenko et al.
2013/0218948 A1 8/2013 Jakobson
2013/0218949 A1 8/2013 Jakobson
2013/0218966 A1 8/2013 Jakobson
2013/0247216 A1 9/2013 Cinarkaya
2014/0359537 A1 12/2014 Jackobson et al.
2015/0033365 A1* 1/2015 Mellor ...................... G06F 8/71 726/29
2015/0347542 A1* 12/2015 Sullivan ................ G06F 9/5072 707/602
2016/0203544 A1 7/2016 Smits et al.
2017/0293629 A1 10/2017 Doan et al.
2018/0025038 A1 1/2018 Semlani et al.
2018/0096003 A1 4/2018 Vaishnav et al.
2018/0129686 A1 5/2018 Vaishnav
2018/0183671 A1 6/2018 Dvinov et al.
2018/0189792 A1 7/2018 Vaishnav et al.
2018/0253481 A1* 9/2018 Heidel .................. G06F 16/273
2019/0205455 A1* 7/2019 Jugel ....................... G06F 16/24
2019/0236184 A1 8/2019 Dvinov et al.
2019/0370363 A1 12/2019 Hersans et al.
2020/0097475 A1 3/2020 Tran et al.
2020/0250189 A1 8/2020 Dvinov et al.
2021/0191718 A1* 6/2021 Draude ..................... G06F 8/77
2021/0216591 A1 7/2021 Dvinov et al.
2021/0241300 A1 8/2021 Vaishnav et al.
2021/0241301 A1 8/2021 Christensen et al.
2021/0241328 A1 8/2021 Christensen et al.
2021/0241329 A1 8/2021 Christensen et al.
2021/0241330 A1 8/2021 Vaishnav et al.
2021/0326311 A1 10/2021 Ker et al.
2021/0397620 A1 12/2021 Wikkerink et al.
2021/0406936 A1 12/2021 Christensen et al.
2023/0385030 A1* 11/2023 McVeigh ................ G06F 8/311
2024/0054149 A1 2/2024 Karanth et al.
2024/0095788 A1 3/2024 Vaishnav et al.
2024/0095789 A1 3/2024 Vaishnav et al.
2024/0143367 A1* 5/2024 Molteni ................. G06N 5/025
2024/0143368 A1* 5/2024 Molteni .............. G06F 9/45558
2024/0168780 A1 5/2024 Vaishnav et al.
2024/0168955 A1 5/2024 Vaishnav et al.
2024/0168956 A1 5/2024 Vaishnav et al.
2024/0169219 A1 5/2024 Vaishnav et al.

OTHER PUBLICATIONS

Mastertheboss, "What is a rule engine?", http://www.mastertheboss.com/bpm/drools/what-is-a-rule-engine/.
Final Office Action, U.S. Appl. No. 17/993,795, Jun. 21, 2024, 27 pages.
Non-Final Office Action, U.S. Appl. No. 17/993,795, Jan. 5, 2024, 32 pages.
Non-Final Office Action, U.S. Appl. No. 18/081,957, Mar. 7, 2024, 38 pages.
Advisory Action, U.S. Appl. No. 17/993,795, Aug. 27, 2024, 3 pages.
Advisory Action, U.S. Appl. No. 18/081,957, Jan. 6, 2025, 7 pages.
Final Office Action, U.S. Appl. No. 18/081,957, Oct. 11, 2024, 27 pages.
Notice of Allowance, U.S. Appl. No. 17/993,795, Nov. 5, 2024, 9 pages.

* cited by examiner

MULTI-CONTEXT STATEFUL RULE EXECUTION

CLAIM OF PRIORITY

The present application is a continuation application of U.S. patent application Ser. No. 17/993,795, filed Nov. 23, 2022, which is herein incorporated by reference in its entirety.

TECHNICAL FIELD

A database providing services operating in conjunction with a rules engine (RE), and more specifically to a multi-tenant database providing services for tenants having a private tenant context storing private extension rules to modify providing the database services.

BACKGROUND

Complicated software may be implemented in a variety of ways. When a process to be programmatically implemented is complex, a rules based system, or rules engine (RE) may be used to combine facts (pre-existing/known or derived) with a rules set to reach a conclusion, such as a result from triggering one or more action. One well-known RE is the Drools engine (see, e.g., Internet Uniform Resource Locator (URL) https://drools.org), which provides, for example, a core Business Rules Engine (BRE), and a web authoring and rules management application. Another well-known RE is the Rete algorithm, which is known for applying pattern matching to facts (also called objects) to determine which rules to execute based on the current state of known facts. It is expected the reader is familiar with Drools, Rete, and other rule engines and their fact based environments and processing logic.

In practice rules to be applied are already known, i.e. static, and represent business logic to be applied to facts (e.g. data) where the facts may change often, such as in response to applying one or more rule. Various contexts may make use of a rules engine. For example, a well-known environment is a database environment that allows interaction by an external source (which may be a computing device, Artificial Intelligence (AI), etc. operated by a customer, a user of a computing device, etc.), where interaction may generate a data structure tracking interaction with the external source. The data structure may represent data for which facts and rules are to be used to review or update the data structure. To give a specific example, the data structure may correspond to an ordering environment such as an automated ordering system, where items to be allocated to an entity are added to a data structure for a cart, and RE rules may be applied to the data structure content to automatically update it as, for example, content/items are added/deleted/modified in the data structure.

Rules may be defined to operate on the content of the data structure to generate a corresponding new and/or updated data structure. For example, rules may recognize a fact indicating the cart identifies an item selected for order and delivery, and a rule triggers obtaining pricing information for the item, shipping costs, and any other information of interest, and this information is used to update the data structure. For example, a cart data structure may now identify, e.g., the cost of the item, its shipping fees, applicable known discount, and/or other information applicable to the cart's current content.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
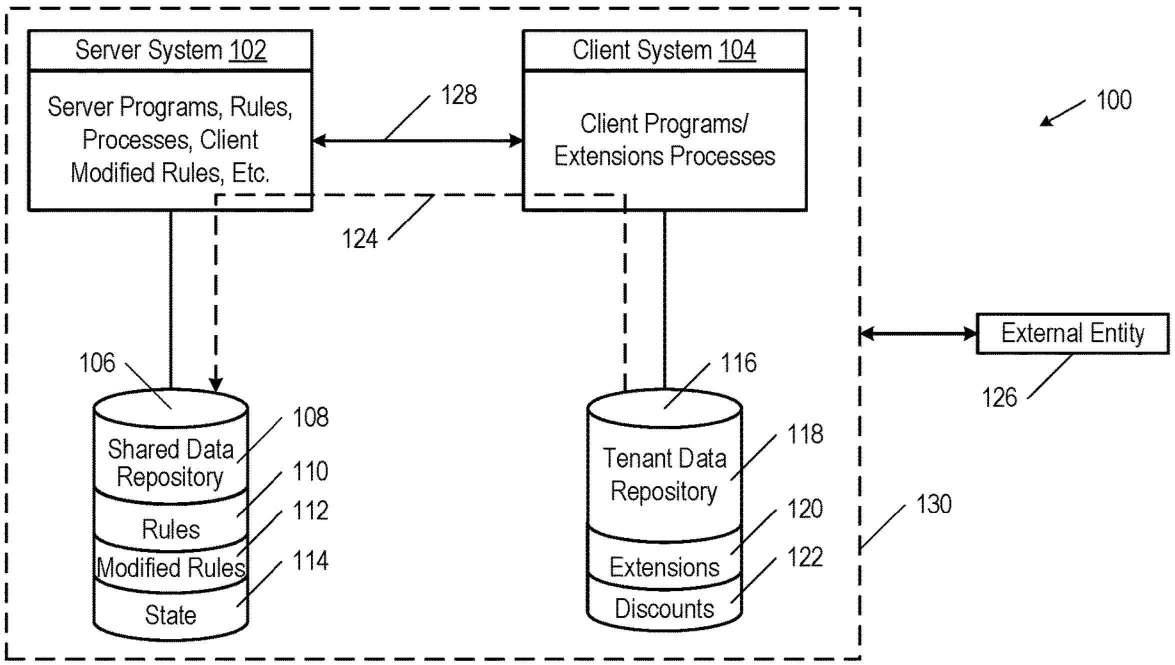
FIG. 1 is a block diagram according to some example implementations.

Overview of Using a Rules Engine (RE)

The following description describes implementations for using a RE in a multi-tenant database environment. It will be appreciated a RE may be applied in any context where business processes, business procedures, and/or business logic may be applied to facts (objects, information, data, etc.). For the following discussion, assume we are working with a Salesforce application such as the Salesforce Revenue Cloud. It is assumed there are multiple areas where rules based logic is required, for example, pricing, product bundle configuration, tax and revenue treatments, approvals, etc. In exemplary disclosed embodiments, a single generalized rule engine core may be used when rules based (declarative) application logic is desired. It will be appreciated the term "single" may include using distributed and/or cooperatively executing rule engines.

To consolidate various existing rule based implementations, data models and dialects across a database platform, and to facilitate managing them using a common interface, all RE rules across the database may utilize an industry standard rule structure and syntax. Rule sets defined for execution by a RE would be referenced by a rule set that may provide directives for a tool to automate complex business processes, such as the Salesforce Flow tool, where the rule set defines flow elements. Flow elements may apply a specific rule or rule set to data gathered by previously executed elements in a flow definition, e.g. data/information already known in a context of a rule being applied. In various exemplary implementations, rule sets may be used to provide a variety of functions, including validating, augmenting data, applying domain specific logic to existing data sets, applying declarative business logic/rules, e.g., to existing flows, etc. In one exemplary implementation, a rules based approach may define business logic in a multi-tenant database platform to enable a RE to be metadata aware. That is, rules may reference standard entities/facts/etc. and also custom fields on standard entities, custom objects and fields.

It will be appreciated rule authoring defines the basic structure of a rule (e.g., an empty 'when' clause followed by an empty 'then' clause), which may be built out by identifying entities and fields a rule will match in the 'when' section, and actions to be taken in the 'then' section. Rules definition may be metadata driven to check rule creation with the appropriate valid entities and fields to select, and restricting available actions available to valid actions satisfying matching criteria. In various exemplary implementations, rules in a given rule set share a common structure, where each rule matches the same facts/objects/fields but with different values. Rules may be defined in a predetermined format and a RE may access the defined rules to construct a rule set to be applied to facts/data. As will be understood by one skilled in the art, applying rules to facts/data allows, e.g., the RE to determine a next action.

In various exemplary implementations, the cart data structure example above may be applied to a backend database environment providing services, such as integration of a pricing engine (having specific data and rules to be used to evaluate, price out, etc. items in the cart) with a RE that applies business logic as discussed above to work with the cart data structure. It will be appreciated operations performed by the pricing engine may correspond to operations performed by the RE. In an exemplary implementation, for each operation performed by the pricing engine there is a related (mapped) operation performed by the RE. Thus, as one example, when the pricing engine prices a transaction, it may update each individual line item in the shopping card data structure. Note the concept here of "line item" is borrowed, for expository convenience, from conventional user-interface contexts (such as shopping) that result in manipulating relevant portions of a shopping cart data structure. Execution of a RE rules triggers data updates to a transaction associated with the shopping cart (updates may be coordinated with fact handles or event handlers discussed below). In various exemplary implementations, a RE processes defined rules for multiple different "clients" (business processes) such as the pricing engine discussed above, as well as other well-known processes such as "revenue recognition service", "product configurator", "taxation engine", "validation service", etc.

FIG. 1 is a block diagram 100 according to some example implementations. As discussed above, a rules engine (RE), such as Drools or Rete may be stored in a server system 102 and/or in a client system 104 and used to encode business processes or business logic. RE rules may have corresponding rule extensions in a client system 104. Please note the designation of client and server is arbitrary and intended simply to differentiate between one system providing a database environment, and another system providing extensions and/or customization to selected operations of the database environment.

As illustrated, the server system 102 may include server storage 106 to store and/or access server programs to utilize the RE and interface it with other programs, processes and/or other systems or machines. The server system may operate to provide or be part of a multi-tenant database having a server database 106 (or other type of storage), which may include storing and/or providing access to a shared first data repository 108 accessible by multiple tenants with shared access rights. The server database may also include rules storage 110 to store rules to be accessed or executed by the RE. The server database may also include modified rules storage 112, as will be discussed below, to represent rules and/or associated facts/data associated with rules modified by a client system 104. The server storage may also include state storage 114, which as will be discussed below, may store, at least temporarily, state information related to the operation of one or more of the rules 110 and/or modified rules 112.

As illustrated, the client system 104 may include client storage 116 to store and/or access client programs to access and/or integrate with, for example, server system programs, rules, processes, or the like accessible by accessing the shared data repository 108 or other server system resource. The client system may access a multi-tenant database, and also maintain a private tenant data repository 118 which may be in a tenant context private to the tenant. It will be appreciated while a multi-tenant database may provide, for example, access to the shared data repository 108 to many tenants and their associated tenant systems, e.g., client system 104, the tenant maintains a private context to prevent inadvertently exposing private data to other tenants. Therefore, the client system may maintain a tenant context private to the tenant. The client database may also include rules extensions 120 storage for extensions to server system 102 rules 110 that may be accessed or executed by the rules engine (RE). It will be appreciated the server system rules 110 may not be RE rules, and instead, the rules 110 represents database operations/procedures, e.g., pricing a cart, where the database operations is mapped to/from corresponding RE facts/rules to enable a client system to dynamically adjust operation of the database operation in accord with client system defined extensions 120.

For simplicity, it is assumed the database operations/procedures rules 110 has a one to one (1:1) mapping with a potential corresponding client system extensions for a database rule. The extension is potential as it will be appreciated some database operations may not have a client system counterpart. Further, it will be appreciated there may be a one to many, many to one, or many to many rules relationship between the rules 110 and rules extensions 120. Also illustrated are client system discounts 122, which are simply one example of data a client system may store, and is presented to tie in with the discussion of rules corresponding to managing a data structure corresponding to, for example, a cart data structure for a store.

In an exemplary implementation managing a cart data structure, it will be appreciated while the server system 102 may maintain general rules 110 and associated data regarding, for example, business logic for associating a price with items in a cart data structure, a tenant's client system 104 interfacing with the server system may have its own discounts 122, promotions, sales, quantity discounts, favored customer discounts, etc. that may be applied by the tenant. Extensions, adjustments, etc. dictated by the client system may be propagated 124 back to the server system and stored, for example, as modified rules 112. It will be appreciated the rules 112 and extensions 120 are presented without reference to data that may be contained in or otherwise accessed by the rules and extensions. Such data may, for example, be stored as desired within the server database 106, shared data repository 108, the client database 116, the tenant data repository, the FIG. 7B multi-tenant database 746 or system data storage 752, or in other data storage as is convenient to the server system or the client system.

Thus, in one exemplary implementation, the server system 102 may host a computing environment for a store, with server programs/operations/rules to accordingly interface with an external entity 126, e.g., remote devices and/or machines operated by customers, automated inventory systems, etc. that access the store. In this exemplary store, the client system 104 may provide extensions 120 that may alter and/or update operation of the store business logic provided by the server system, e.g., by modifying server system rules 110, such as to implement specific types of discounts 122 or other changes desired by the client. The modifications may be dynamic and substantially in real-time, e.g., live to an external entity accessing the store. When the entity accesses the store, the business rules engine responding to the entity will communicate with the client system, such as over a private and/or public data path 128, to engage with extensions 120 (if any) that adjust operation of the store. Modifications, such as by way of rules extensions 120, discounts 122, etc. may be propagated 124 from the client database 116 to the server database 106. From the perspective of the external entity, the entity may be communicating with an effective combination 130 of the client system and server system cooperatively executing to provide the store to the entity. It will be appreciated an interface (e.g., network connection, access point, web page, etc.) for the combination 130 may be hosted by the server system or by other entity/party to transparently provide access to the store.

Programmatically, the server system may access its database, and/or access its shared data repository storing multiple standard rules, e.g., rules seen by all client systems, and identify a standard rule identifying operations to perform, where the rule identifies an associated extension point. As noted above there may be one or many relationships between standard rules and extension rules, and a standard rule may have an extension point linking to, for example, client system extensions 120 that modify the standard rule. The server system and/or the client system may access a second data repository, e.g., the client database 116, storing rule extensions 120, to identify an extension rule accessible by the extension point and defining modification to performance of the standard rule. As will be appreciated, standard rules and extension rules may be executed contemporaneously, and as noted above regarding privacy contexts, the standard rule may operate in an execution context different from a private tenant context for an extension rule that modifies the standard rule with data from the tenant context.

As will be appreciated by one skilled in the art, a rule engine (RE) may be constructed as a fire and forget environment. In the store example above, manipulating a cart, adding items, deleting items, determining discounts based on cart content, sales, favored customer status, etc. are typically resolved by a rule and when the specific functionality ends, e.g., when pricing the cart content ends, the context/state data is lost. However, with the integration of client system extensions 120 to the server system rules 110, there are instances where it may be convenient to provide state preservation not found in RE environments. For example, there is overhead in the propagating 124 data back to the server system. Thus, in some exemplary implementations, the server database 106 may store state 114 data to at least temporarily maintain state for a certain period of time. It will be appreciated the period may be time based, such as half an hour, transaction based, e.g., so long as the entity is actively engaging the server system, or based on some other metric. A flag may be used to indicate when to save and release saved state. It will be appreciated the flag could be set/determined by the server database because of, for example, repeated calls to a pricing engine in what-if testing, Alternatively, or in addition, the flag may be set/determined by the client system, for example, in an extension point for the client system.

Thus, in a store context, rules execution may follow a general flow of a series of operations. For example, for a pricing engine, an operation sequence may be initialization, pre-calculation, sales item price calculation, post-calculation, aggregation, and completion. At each operation, server system rules 110 defined for the operation may be performed with a check made as discussed above to see if an extension point (a logical connector not illustrated) is applicable/available to the current operation, where, if available, the extension point leads to the client system extensions 120. Extensions may be executed and results propagated 124 back to the server system. It will be appreciated both client system extensions may add, delete, and/or modify data, objects, facts, and/or next steps otherwise taken by the server system. Unlike with a conventional RE environment, extension points allows standard rules/procedures provided by a database to be customized to by tenants, such as to benefit other entities, such as the external entity 126 accessing a store presented by the combination 130 of the client system and server system, while allowing tenants to maintain data privacy from other tenants.

In various implementations, a flag to maintain state may be associated with a desire to preserve state. It will be appreciated a flag to maintain context state may be associated with a rules engine (RE) rule and/or client system extensions 120. If the RE is to maintain state, current state may be written out instead of cleared at end of rules. This allows, for example, a temporary memory so trying various what-if scenarios, such as adding/deleting items from a cart, modifying a number of items in a cart, applying discounts, etc. may be performed without having to redo all calculations previously performed. This may matter, for example, if a cart value required expensive (time, cost, etc.) lookups to determine applicable discounts that would be need be recomputed if this state was lost.

Figure 2A:
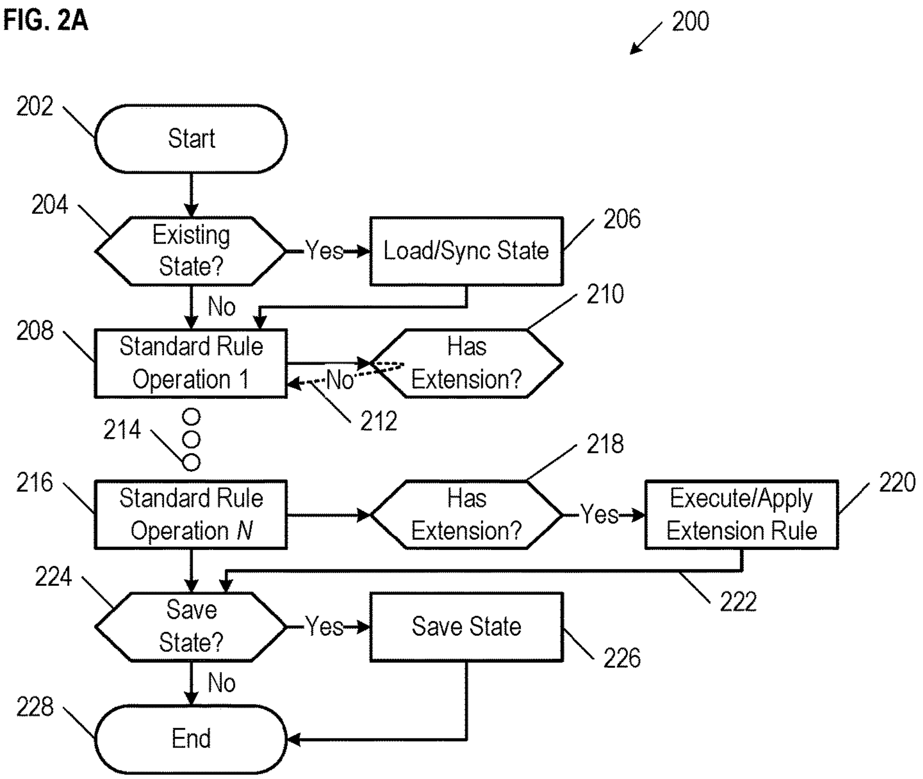
FIG. 2A is a flow diagram according to some example implementations.

FIG. 2A is a flow diagram 200 according to some example implementations. It will be appreciated there is complexity in providing a general purpose rule engine (RE) as discussed above and as applied in the FIG. 1 exemplary implementation. In this FIG. 2A implementation, the RE has been separated from the rules and data model. A business (or functional) domain, such as the store example discussed above, may have a defined data model. In a traditional RE, an application typically reads data, and executes (calls) the rules using the application data. In the illustrated implementation, instead a standard rule syntax is applied to all domains, where a rule action may call domain specific application logic in response to matching domain objects. This inverts the traditional model, where application logic finds and calls appropriate rules based on current data values. Instead, the RE matches domain data to rules, and calls out to the application when a rule fires.

In this exemplary implementation it is assumed the RE is based on the Rete rules engine. It is assumed the reader is familiar with the use and implementation of the Rete environment. Greatly simplified, the RE reads rule definitions, constructs a Rete graph, and domain specific, e.g., store related, data (objects) are inserted into the Rete network by domain specific application logic. The RE matches data to the rules incorporated into the graph, and calls back into the application logic whenever a rule is matched. Since a general purpose rules engine may serve multiple domains, rules may be partitioned based on functional domain, subdomain, e.g., within a given organization, and/or based on other criteria as desired. Rules within an organization are generally organized into one or more nested rule submodules, e.g., a ‘knowledge base’. In the store example, there may be a first organization may have rule groups defined for Quoting, which may contain (nested) rule groups for a Pricing rules module and a Product Configuration rules module. A second organization may define rules groups for Quoting (like the other organization), but also define a rules module for Billing, and Revenue recognition. It will be understood for the second organization, the RE network (graph) may accessed with respect to any starting point in the graph, e.g., the Quoting rules define a graph including the graphs for the Pricing Rules and Configuration Rules, whereas starting with either of the sub-modules represents a graph of what's within the sub-module. It will be appreciated that rule execution order may be left up to the RE, or it may be orchestrated such that rules and/or rule groups fire in a desired order. For example, in the second organization it would be logical to first process product configuration rules before processing pricing rules.

In some implementations, the RE is configured to execute rules associated with defined extension points. To distinguish between common rules available to all tenants, and tenant-specific rule extensions, FIG. 1 server system 102 rules 110, are referred to as standard rules, and client system 104 extension rules are referred to as extensions 120 accessible by way of extension points mapping server system rules/operations with the extensions. When a server system rule starts 202, a first operation may be to check if 204 an existing state exists for this rule. As discussed above, an RE is typically stateless after completing rule execution, and for example, a pricing engine and it's pricing rules (along with defined extensions) will be executed and when they complete, the state of data associated with the module/rules is released. However, it will be appreciated operation in conjunction with extensions has overhead, and multiple calls to, for example, a pricing rules to perform "what if" pricing tests, with adding and deleting different items from a cart, this may result in repeating operations already determined in previous invocations to the RE and applying database pricing resolution services. While it is not incorrect to repeat computations, it will be appreciated for efficiency, it may be useful to at least temporarily retains some state, e.g., to save some of the previously computed pricing or other data retrieved during a previous operations performed in a pricing engine. If 204 previous derived data was saved, that previous state data may be loaded 206 or otherwise synchronized to the database operation to bootstrap the presently executing standard rule.

Execution may proceed to the first operation 208 of the standard rule operation. Since this is a generic discussion of processing a business procedure, the actual rule could be any rule or rule set for organization business logic. In processing operation 1, a test may be performed to determine if 210 there is an extension. In various implementations, rule extensions may be identified by way of an extension point (not illustrated) associated with a standard rule that may be associated with a rule extension, e.g., client system 104 extensions 120. The phrase "associated with" is intended to mean all possible ways to link, cross-reference, point to, invoke, call, address, etc., the rule extension with the standard rule. It will be appreciated the association may be explicit programmatically, e.g., hard coded into a rule and/or an extension, or the association may be derived through operation of the RE or other application, such as a linker or dynamic interpreter. For the purposes herein, linkage is presumed to be automatically derivable.

In the illustrated implementation, there is no extension for the first operation 208 and processing loops back 212 to the first operation. It will be appreciated there may be many operations 214 to be performed for the current rule/operations, until an $N^{th}$ operation 216 is reached. In performing this operation, a test may be made to determine if 218 the $N^{th}$ operation has a rule extension. In contrast with the first operation 208, there is an extension, and the associated extension rule 220 is executed or otherwise applied to the operation of operation N. As discussed above, a rule extension may operate to augment or replace the standard rule/operation being performed by a database. Changes by an extension include, but are not limited to, adding and/or deleting rules, data, objects, extension point associations, data calculations, chaining other rules and/or functions, etc. Operations available to performing an extension are arbitrary to the extent they comply with server system 102 context and access restrictions of the standard rules.

After executing 220 the extension rule, processing may continue with the next operation, which in the illustrated exemplary implementation is to check if 224 the current rules execution state should be saved. If yes, then the state is saved for later use, e.g., the next time the RE is called, starting 202 will check if 204 state was saved and load/synchronize 206 with it.

Figure 2B:
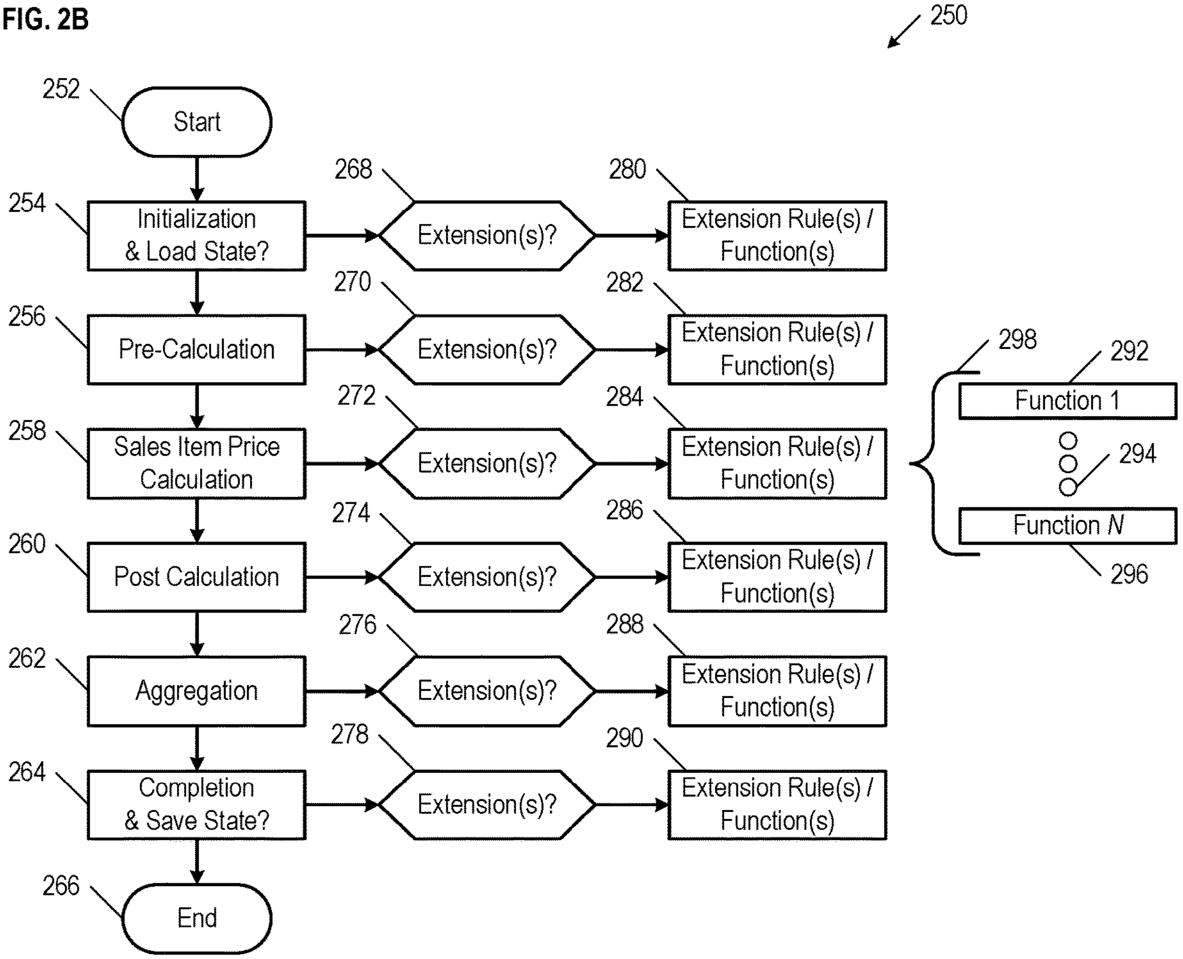
FIG. 2B is a flow diagram according to some example implementations.

FIG. 2B is a flow diagram 250 according to some example implementations, and represents a more specific example of the general rule execution discussed in FIG. 2A. In this implementation, execution of pricing engine is shown, where it is assumed, for example, that the server system 102 database 106 is accessed to retrieve from the database rules 110 pricing rules/operations for performing pricing engine. The retrieved rules/operations, as will be appreciated by one skilled in the art, may include reading a serialized knowledgebase for the current business domain, e.g., a store example with a cart data structure to be modified as the store is accessed, such as by a FIG. 1 external entity 126. It will be appreciated the cart data structure may be stored in a volatile and/or non-volatile memory, and may for example be stored/cached in a random access memory (RAM), or RAM based disk, database, or the like, and the data structure may be preserved in a non-volatile memory, e.g., written out to a disk or other state-preserving medium. As with FIG. 2A, each pricing engine operation 254-264 (sometimes referred to as a "flow") may have a corresponding one or more extension point, that if 268-278 associated with one or more extension rule(s)/function(s) 280-290, allow tenant controlled extensions to be executed/applied when executing the standard rules/operations 254-264.

For this exemplary implementation, assume a store is accessed, where activity in the store results in multiple calls to the pricing engine. For example, accessing a web page listing products and presenting pricing information may represent a call to the pricing engine. Selecting a product and adding it to the cart data structure from a product details page may call the pricing engine to confirm pricing or other information. Clicking a checkout button may again call the pricing engine to price out/adjust items (line items) in the cart data structure. It will be appreciated repeated calls may be made to the pricing engine while engaging the store to determine initial and subsequent content in the cart data structure, such as to update pricing (e.g., prices may change based on what is placed in the cart), discounts (e.g., applying a buy-one-get-one discount), etc. Each call to the pricing engine typically results in executing all of the illustrated operations from start 252 to end 266.

In one exemplary implementation, the pricing engine corresponds to a configure, price, and quote sales tool. One example of such a tool is CPQ tool. It will be appreciated disclosed concepts are applicable to any business process/operations sequence such as sales or other activity that has a series of operations, e.g., items 254-264 that may have custom extensions and/or functions 280-290 to be applied by a RE when performing the operations. In this exemplary illustrated embodiment, the pricing engine starts 252, and a first operation 254 may be to initialize the rule configurations, parameters, etc. and determine whether to load a saved state as discussed above with respect to FIG. 2A. A test may be performed to determine if 268 the initialization operation has a corresponding extension point leading to one or more corresponding extension rule(s)/function(s) 280 that may be executed/applied. A tenant/client system may elect to initialize data along with initializing the start of the pricing engine, for example, based on a current status or state of the server system or the hosted environment the client system is accessing. As discussed above, initialization may also load, for example, data from a database identifying products, product details, transaction currency, price points for the product in the elected currency, etc.

After initialization, a next operation may be to run pre-calculation rules 256, which may perform a variety of tasks, such as calculating formulas on fields related to quote lines, executes pricing rules on content in the cart data structure, updating database records, determine fixed item pricing, evaluate dynamic data, etc. Pre-calculation may, for example, apply initial discounts for items in the cart data structure, such as check if an item quantity is greater than 10 (an arbitrary threshold for this example), and if so extend a 5% off discount, or take other action based on cart content prior to other calculation. In one implementation, pre-calculation may create a discount object assigned to a cart line item. As with other illustrated rules/operations, contemporaneous with pre-calculation, a test may be made to determine if 270 there is a corresponding extension point leading to one or more corresponding extension rule(s)/function(s) 282 to be executed. Extension may, for example, change the underlying data, computation metrics, baseline discounts, etc. for initial computation(s) for configuring and/or updating, for example, preliminary pricing data stored or to be stored in a shopping cart data structure. The term contemporaneous is used herein as it will be appreciated that while some server system rules/operations must be processed before accessing an associated extension rule/function, other times they need only be contemporaneous, although it may be required they both complete before moving on to the next standard rule/operation.

After pre-calculation 256, another operation may be to perform sales item price calculation 258 which includes, in this exemplary implementation, inspecting the cart data structure for items (or other data/content) in the structure and performing line item calculations, such as multiplying unit prices by quantity, applying any discounts (e.g., applying discount objects) determined in pre-calculation 256, and otherwise working out a current price for items in the cart. It will be appreciated the displayed order of rules/operations in the pricing engine may be preset or arbitrary, that is, the displayed order of operations 254-264 is exemplary. In a general case, rules/operations may be executed in another order, substantially simultaneously, or based on dependencies and/or interdependencies implicitly or explicitly set between operations. That said, in the illustrated exemplary pricing engine implementation, there is an implied order to the operations 254-264 since we are in a sales context. However, in other business logic contexts, the a required order may be lacking and/or left to live resolution. Rule/operation flexibility may allow, for example, optimizing costs associated with operation performance, such as to coordinate data access to minimize resource consumption, cost, etc. It will be appreciated rule execution order may be pre-set in a variety of ways. For example, a naming or ID assignment convention may be used to control order (e.g., apply rules alphabetically or numerically). Or they may be assigned dependency relations to allow dynamically determining rule execution order based on satisfying assigned constraints, thus facilitating automatically adjusting rule execution responsive to changing conditions in access of the store.

As with other rules, a test may be made to determine if 272 there is a corresponding extension point leading to one or more corresponding extension rule(s)/function(s) 284. In this exemplary implementation, rather identifying an extension rule, instead the extension leads to a series of functions 292-296 (indicated here are Function 1 through Function N) that may be executed in furtherance of performing the sales item price calculation operation 258. These functions, as will be appreciated by one skilled in the art, may step through a cart data structure and apply tenant-desired rules, metrics, discounts previously determined, or take other action updating pricing for items identified in the cart data structure. In some implementations, each of the price engine rules 254-264 may have an associated series of functions (not illustrated), and either or both of functions and/or extension rules may be executed.

A standard rule/operation of a server system, e.g., the sales item price calculation 258 operation, may access data in a public and/or shared data space to allow data sharing and rules/operations access by tenants in a multi-tenant database environment, e.g., by a client system 104. The extension rule(s)/function)s) 280-290 may access data in a private data space context private to the tenant providing the extension/function, e.g., private to the client system. In such fashion, each tenant may securely and privately provide one or more extension rule or function to adjust a standard rule/operation in accord tenant interests and data management goals. For example, the standard rule/operation may not provide for a discount, but the tenant may provide a discount in the pre-calculation 256 operation based on the content within a cart data structure that is applied in the sales item price calculation 258. Tenant adjustments to a standard rule/operation, e.g., updating a rule in the FIG. 1 database 106 rules storage 110, may be at least temporarily stored privately and inaccessible to other tenants as a modified rule/operation in the database 106 modified rules storage 112.

As with the general overview discussed in FIG. 2A, the remaining operations 260-264, e.g., post calculation 260, aggregation 262, completion & save state, may proceed as discussed to determine if 274-278 extension points exist that link to extension rules 286-290, where each may have one or more functions or other actions to be taken to adjust the standard rule operation. After sales item price calculation 258, and post-calculation 260, Aggregation 262 may, for example, perform a summation of line items assigned a price in the sales item price calculation to update the cart data structure with a total cart value at the cart level. A completion operation 264 may be performed to look at the aggregated cart data structure to determine if there are other discounts that may apply, such as a general discount for carts exceeding a price threshold.

It will be appreciated the foregoing has provided one exemplary approach to interacting with a store and generating pricing information both based on public standard rules/operation as modified by tenant private extensions. It should be clear the specific examples in the present pricing engine are exemplary. Further, adjustments may include adding/changing/deleting/etc. standard rules/operations, adding/changing/deleting/etc. data associated with a rule/ operation or with an extension rule/function. When all operations 254-264, 280-290 have been executed, processing of the illustrated pricing engine may end 266. Depending on the results of decisions discussed above regarding saving state, selected ones of results from executing operations 254-264, 280-290 may be been saved to assist repeated calls to the pricing engine or other operation.

Figure 3:
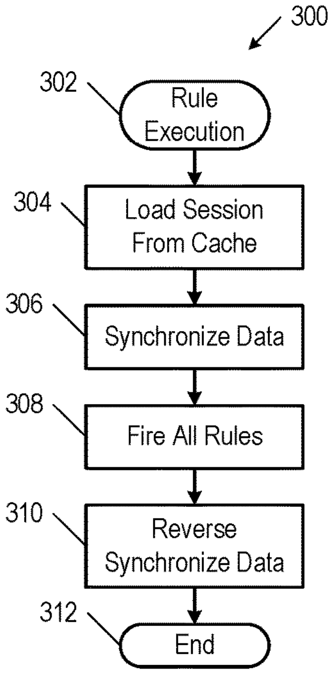
FIG. 3 is a flow diagram according to some example implementations.

FIG. 3 illustrates a flow diagram 300 according to some example implementations. It will be appreciated that after a rule is initialized, which may, for example, include loading it from a knowledge base, and establish it with configuration parameters such as resource limits (e.g., allocated memory, etc.) to comply considerations related to multi-tenant access and sharing resources, the session may be stored in a cache, at which point the session represents a blank slate from which to start work. As discussed above, rules/operations may be executed multiple times. When a rule is executed 302, the session for the rule is loaded 304 from the cache, the data for the rule is synchronized 306, and then the session is populated with data for rules and extensions/functions (see, e.g., FIG. 2B discussion) to work on. At this point the system can fire 308 all rules. As discussed above, the current state of data associated with a rule may determine which rules fire as well as direct performance/operation of the rule. It will be appreciated while there may be many rules associated with, for example, a pricing engine, at any given moment only a subset of available rules may be actually applicable. One skilled in the art will appreciate that a RE using, for example a Rete tree data structure, may be configured in such a way (see, e.g., the FIG. 5 discussion) such that the RE will identify which rules apply to a current situation. After firing (applying) applicable rules, the current state data may be reverse synchronized 310 to capture changes that occurred during execution of a rule. After changes are put back into the cache, execution of the rule ends.

Figure 4:
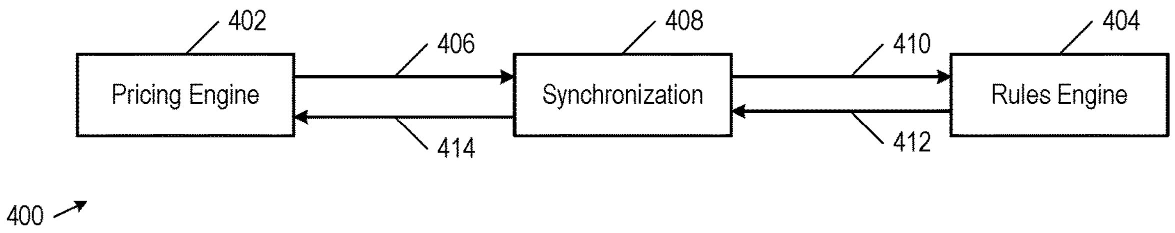
FIG. 4 is a flow diagram according to some example implementations.

FIG. 4 is a block diagram 400 according to some example implementations. In this implementation, there is a pricing engine 402, that as discussed above, is cooperatively operating in conjunction with a rules engine 404. It will be appreciated the pricing engine, and the multi-tenant database environment providing the pricing engine, may store its data in a format different from that used by a rules engine (RE). For example, the pricing engine may store data as database objects in a database format, e.g., as a Salesforce (or other database) object format, whereas the rules engine stores its data as "facts" in a format set by the RE. It will be appreciated a RE only works on facts, not database objects. Therefore when a rule is synchronized 306 or reverse synchronized 310 as discussed above with respect to FIG. 3, this requires data from the pricing engine to be provided 406 to a synchronization layer 408 (e.g., a program or subroutine) that receives the database object and converts it into an equivalent fact. The converted fact is provided 410 for processing by the rules engine.

After the rules engine processes its rules based on converted facts, which as discussed above may include creating, deleting, and/or modifying facts and data, results from the rule may be provided 412 back to the synchronization layer to reverse synchronize the data. Reverse synchronization converts the RE facts (including any new facts created while acting on the provided 410 facts) back into database objects. The pricing engine will become aware of changes made by the rule(s) by way of the reverse synchronization as the reverse synchronization may result in database objects being added, deleted and/or modified.

It will be appreciated providing 406, 410 and returning 412, 414 data may occur by reference, e.g., by way of a pointer with associated meta data, to the database objects and facts. The meta data may indicate whether data was added, changed, deleted, etc. Sharing pointers with meta data facilitates data transfer and increases speed of combining operation of, for example, a pricing engine with rule extensions handled by a rules engine. In one exemplary implementation, a pointer with associated meta data may be implemented, for example with "struct" data structures or their equivalent as used in the C/C++ programming language, or with Java reference objects or their equivalent as used in the Java programming language.

Figure 5:
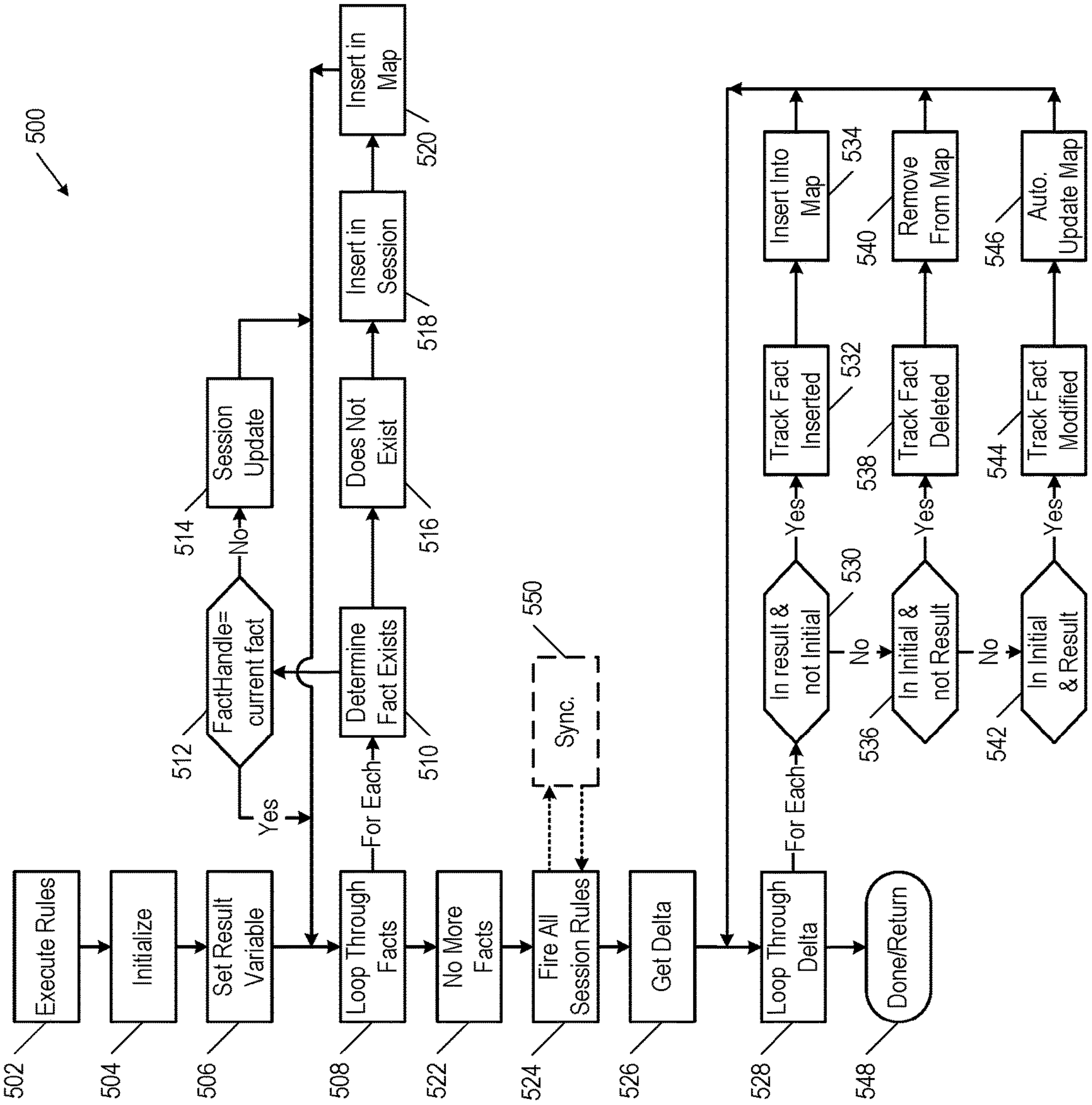
FIG. 5 is a flow diagram according to some example implementations.

FIG. 5 is a block diagram 500 according to some example implementations. As discussed above, a business logic program or module, such as a pricing engine may be considered a programmatic client in communication with a rules engine (RE). It will be appreciated that the pricing engine and RE typically operate using completely different data formats, and hence the above-described synchronization is needed to dynamically translate between the two environments. For example, each operation in the pricing operation has associated database formatted objects, e.g., Salesforce "sobjects", which correspond to products, sales, taxes, discounts, etc. represented in the database that may be accessed during execution of, for example, the pricing engine or other process. The RE in contrast maintains "fact" objects that are used by the RE to process its rules. The RE is independent of and agnostic to the structure of the database. In the illustrated implementation, assume there is a one to one (1:1) mapping between database objects and fact objects; this assumption provides opportunities to streamline processing performed by the RE.

Recall that a RE may work under a "fire all rules" principle. For a small number of rules this is ok, however if there are many rules, this may unnecessarily introduce processing overhead if, for example only 3 rules of 100 are applicable to a current situation. Thus, assuming a 1:1 mapping, optimization may be made to streamline the mapping (synchronization) between database objects and fact objects. In some exemplary implementations, fact handles may be used to facilitate the synchronization between the database and the RE. Let us assume a fact handle is implemented as a Java reference object. It will be appreciated using a pointer reference system such as the Java reference object, the environment may, for example, initialize a rule, establish pointer references corresponding to database objects, and track them together as well as efficiently determine whether the RE has changed, added, and/or deleted RE facts.

As illustrated a RE fact handle is a data structure/object that contains a memory pointer and other data to wrap a RE fact and provide a handle (pointer) to access the wrapped fact. When a rules collection is first executed 502 [executeRules (Collection<EntityFact> entityFacts)], e.g., when an extension rule for a standard rule is accessed, there are no wrapped facts corresponding to facts. Note, to assist with understanding the illustration, diagram description may include pseudocode [in brackets like this] in a Java-type language format to assist with appreciating how operations may be implemented programmatically.

When a rule (such as the FIG. 2B sales item price calculation 258) is initialized 504 [Initialize empty RuleFiringResults(variable "result")], a session may be created, along with creating a map (e.g. cached in memory) for storing an identifier (ID) for a fact handle. It will be appreciated by one skilled in the art a fact handle, such as used by the Drools RE, corresponds to an ID representing an inserted object (fact) within, for example, memory. A "results" variable may be instantiated to track facts that exist after executing rule. That is, as rules are executed, results from rules operations are added to the results. Initially the results is empty, but by the end of executing a rule, the ID to fact handle map is populated as will be discussed below. When processing operations, such as in the FIG. 2B exemplary pricing operations, after initializing the result variable (e.g., a Java object or other data structure) is set 506 (seeded) with initial facts corresponding to data/information from the database [result.setOriginalFacts(entityFacts)]. In one implementation the state of the standard rule, process/module being executed (e.g., the pricing engine) and/or other database-related data may be provided to the RE as initial facts (e.g., after translation into RE facts from database objects). As noted above, as RE rules are executed, the results object will be updated as will be discussed further below.

After initialization, exemplary implementations may loop 508 through all known facts. Recall, assuming we are executing the pricing engine, the facts ("entityFacts" in the result object) may identify products, items, discounts, etc. For each fact item, the fact ID may be determined 510 [get FactHandle for fact.Id from idToFactHandleMap], and a check may be made to determine if 512 the current fact handle is the same as the retrieved fact handle [Is FactHandle.fact==currentfact?]. If yes, the fact has not changed and processing may continue with looping 508 to the next fact. However, if 512 the current fact handle is different from the existing fact handle, one skilled in the art will appreciate then something changed. So rather than, for example, reinserting the object, instead exemplary implementations instruct the session to update 514 the record associated with the fact handle [session.update (factHandle, fact)]. It will be appreciated with this exemplary implementation, optimizations may be realized. By looping 508 through facts to determine the existence of corresponding fact handles the illustrated exemplary implementation may reduce the number of rules that actually need to be considered (e.g., exemplary implementations may prune a Rete search tree). For example, if 100 objects were passed in, but only updated 3 objects, the other 97 rules associated with the 97 unchanged objects do not need to be fired. Put another way, whether something has been changed/inserted/deleted may be specifically identified. Hence, if a fact handle is present and the facts are different, an update 514 is called.

If 510 a fact handle is not present, then the object does not exist 516 and this represents the first time invoking the rules engine, and therefore the object is inserted 518 into the rule session [FactHandle factHandle=session.insert(fact)], and inserted 520 into the map (fact handle map) [Insert factHandle against fact.Id in idToFactHandleMap]. As will be appreciated by one skilled in the art, the session insert 518 activates the RE (e.g., Rete) nodes associated with that object and they are inserted 520 into the map. The looping 508 continues until all facts have been gathered, and when there are no more facts 522 to process, processing may continue with calling the underlying RE to "fire all rules" 524 [session.fireAllRules( )], which as will be appreciated, changes the session.

After firing all rules a delta may be determined 526 between the starting facts and the facts present after firing 524 all rules [Collection<EntityFact> al/Facts session.getFacts; result.setFinalFacts(allFacts); get delta between "entityFacts" and "allFacts" (check for equality infield values)]. As with looping 508 through initial facts, processing may loop 528 through the facts delta. If 530 a fact exists in the results variable (after executing all rules) but not in the initial facts set [Fact present in "allFacts" but not in entityFacts], one skilled in the art will appreciate the RE inserted 532 (e.g., created) a new fact. In the illustrated exemplary implementation, the inserted fact will be tracked, and a subsequent operation may be to insert 534 the new fact into the map [insert fact into idToFactHandleMap]. Processing may then continue with looping 528 through the delta.

If 530 not, e.g., a fact is present in the results and also in the initial facts, a further test may be made to determine if 536 the fact is present in the initial facts, but not present in the results variable/final facts [Fact present in "entityFacts" but not in "al/Facts" ], it will be appreciated the RE deleted 538 a fact, so in the inverse of an added fact instead the deleted fact may be tracked (e.g., add it to a deleted facts list) and remove 540 the fact from the map [remove fact from idToFactHandleMap]. It will be appreciated the map may facilitate calls to the RE, for example, the next time the RE is called the map contains the fact state from previous execution of the rules. This starting map state for a subsequent rule execution bootstraps that execution and, as one will appreciate, speeds up a subsequent call to the RE. In the illustrated implementation, if 536 the fact was not present in the initial facts and not in the result facts, at this point it is known the delta fact was neither inserted nor deleted, a test may be performed to determine if 542 a fact is present in both the initial facts and the result facts [Fact is present in both "entityFacts" and "al/Facts" but afield value is different], and track that one or more fact aspect, e.g., a field value, has changed/been modified 544. In this case, the fact being modified may be tracked (e.g., add it to a modified facts list), and automatically updated 546 [idToFactHandleMap gets automatically updated (pass by reference)] but there is no need to modify the map because the fact is already in the map. Processing may continue with looping 528 through the delta.

When there are no more delta facts to review, processing may return 548, in this exemplary implementation, to the pricing engine that called on the RE. Which, as will be appreciated, triggers synchronization 550 after firing all rules 524 and looping 508, 528 through all facts and the deltas as discussed above. In the illustrated implementation, after traversing the diagram, there are variables tracking inserted, deleted and modified facts. These changes may be reflected in the results variable (results object) and returned so that the next call to the RE the ID map and fact handle map already has all information loaded from the prior execution. In a subsequent invocation, then, instead of activating all nodes in, e.g., nodes in a Reet node graph, instead only nodes about a particular fact are activated. To place this with a specific example, returning to the context of accessing a store as discussed in FIG. 2B, when the checkout button is activated, on the backend processing, the FIG. 5 flow diagram is processed as part of, for example, pre-calculation, completion, etc. and returns an updated results variable. Therefore, if pre-calculation inserts a discount object, as part of completion, only the rules related to facts that changed in previous operations fire, e.g., only rules related to the new discount object from pre-calculation fire (which is the fire 3 rules not 100 rules example above). It will be appreciated that at the end of the pricing engine, the result state may (or may not) be preserved. For example, in the what-if scenario discussion above, it would be efficient to keep results for a period of time and/or based on some desired check.

It will be appreciated instead of fact handles, instead asynchronous event listeners may be used to signal the activation of server system rules/operations (e.g., standard rules) and/or activation of client system extensions to the standard rules (see, e.g., FIG. 6 discussion below). For example, the rules engine (RE) may be configured to listen for an event associated with a executing standard rule and match it to one or more RE fact, e.g., matching may be based on matching corresponding ID or other value/data associated with the standard rule and associated fact(s). The RE may fire some or all rules as discussed above and hand processing back to the server system when finished.

It will be appreciated the illustrated exemplary embodiments include features and configuration possibilities not specifically called out above. For example, server system rules/operations may be dynamically or otherwise adapted based at least in part on a configuration parameters associated with a tenant, and the state preserving flag may be disposed in one or more locations such as storage associated with the server system and/or associated with a tenant/client system. In some implementations state preservation/destruction may be dependent on the state of a flag, but may also be dependent on other considerations, such as if Artificial Intelligence (AI) is used to monitor operation of, for example, a store supported by the server system and the AI determines it would be efficient and/or cost effective to maintain state. It will be appreciated that server system rules/operations may have a defined extension point leading to an extension desired by a tenant that cannot be performed. It will be appreciated executing a standard rule/operation may generate one result that may be completely replaced by executing a extension to the standard rule.

Figure 6:
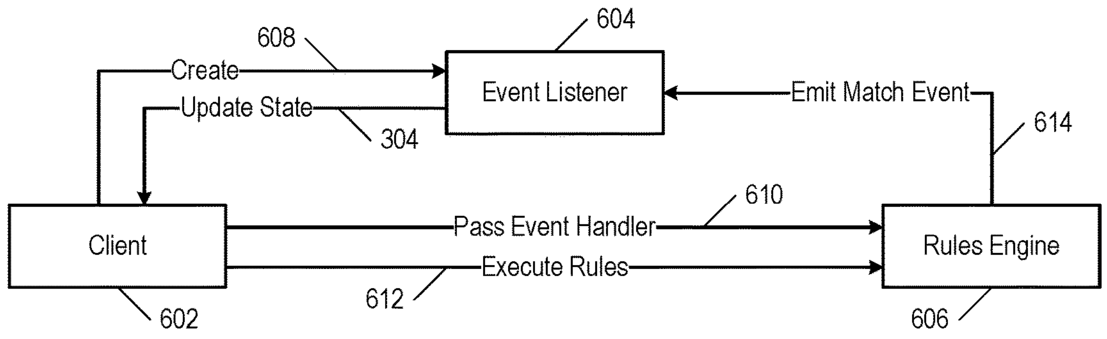
FIG. 6 is a block diagram according to some example implementations.

FIG. 6 is a block diagram 600 according to some example implementations. As discussed above with respect to FIG. 5, a business logic program or module, such as a pricing engine may be considered a programmatic client in communication with, for example, a customizable processing environment, such as a rules engine (RE), artificial intelligence (AI), expert system, logic environment, or other programmatic feature, data structure, process, etc. It will be appreciated that the pricing engine and processing environment may operate using completely different data formats, and hence, as with FIG. 5, synchronization and/or processing coordination may be needed to allow these different environments dynamically translate between the two environments.

In exemplary implementations, such as in FIG. 5 or in FIG. 6, as discussed above, synchronization may be performed at various times. For example, it may be performed by the business logic program/module/client, e.g., the pricing engine discussed above, before operation of rules, e.g., the client may loop through its database objects (e.g., sobjects) and create entity facts for each of its objects, and then after the return 548 operation, the client may then insert/delete/update objects based on the content of the rules engine variables tracking corresponding facts. However, the mechanism for performing the synchronization and data translation as needed between the client (pricing engine) and the rules engine (RE) may vary. In FIG. 5, calling the rules engine established the client objects to RE facts on call, and on return from executing the rules, the variables tracking changes to the facts were translated into corresponding changes to the client objects (e.g., sobjects).

In the FIG. 6 exemplary implementation, a client 602 synchronizes data (see, e.g., FIG. 3 item 310) between, e.g., a FIG. 1 server system 102 and client system 104 using an event listener 604 based at least in part on interaction between the server system and a customizable processing environment such as a rules engine (RE) 606. One skilled in the art will appreciate an event listener may be defined, for example, as used in the JavaScript programming language. It will be appreciated JavaScript is noted here simply to provide one technology example that may be used, and other programming languages/environments may be used without departing from the spirit and scope of the technology concepts discussed herein. The client 602 may, for example, be a pricing engine as discussed above with respect to FIG. 5). The client may create 608 an event listener 604 and the event listener is passed 610 to the rules engine (RE) 606.

For example, during initialization of the RE (see, e.g., FIG. 2B item 254 initialization discussion), the client creates 608 the event listener and passes 610 the event handler to the RE. When the RE executes 612 rules, e.g., as discussed above with respect to firing (some or all) rules, when there is a match to a rule firing, the active rule emits 614 an event to identify the match. It will be appreciated by one skilled in the art the FIG. 5 exemplary implementation may be applied in FIG. 6 substantially identically, except that the fire all session rules 524 and/or sync 550 elements may be modified to utilize event listeners as discussed in the FIG. 6 exemplary implementation. The event listener 604 is listening for such event emissions and automatically updates 616 the client state. In such fashion, as rules are executed data from the rules engine format may be dynamically and automatically synchronized back as needed to a format utilized by the client.

Thus, for example, when initializing a rules engine, the client may construct an event listener, construct a rule executor with the event listener, create a new execution session, and add the new event listener to the session. It will be appreciated the process flow of FIG. 5 may be applied in the FIG. 6 implementation, where the fundamental change in operation is to synchronize by way of the event listener. For example, the state of the RE may be the same as discussed with respect to FIG. 5, where tracking and synchronizing adding/deleting/changing RE nodes instead uses the event listener. It will be appreciated in the exemplary illustrated embodiment, since every rule has a condition and then an action to perform, each change to RE data (e.g. adding/deleting/changing) calls the event listener which performs corresponding client object synchronization (e.g., corresponding adding/deleting/changing client objects). In the illustrated embodiment, instead of a fact handler looping to synchronize and convert rules engine data back to client objects, instead the event listener performs synchronization. It will be appreciated that the event listener may defer, delay, cache, combine, collate, reduce (e.g., skip operations such as an add/delete that cancel out), or otherwise optimize performing the synchronization back to client data. It will be further appreciated an event listener as discussed provides for a rules execution audit service. For example, as rules engine events are fired, the execution of the event listener (responsive to emitting 614) may be used to also log the events.

Example Electronic Devices and Environments

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
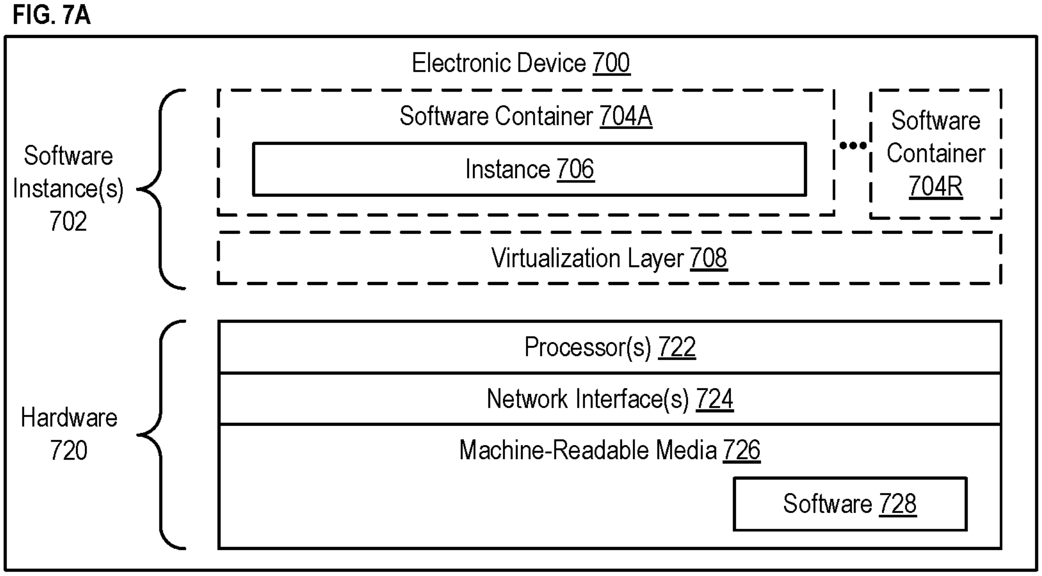
FIG. 7A is a block diagram illustrating an electronic device according to some example implementations.

FIG. 7A is a block diagram illustrating an electronic device 700 according to some example implementations. FIG. 6A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 326 may include non-transitory and/or transitory machine-readable media. Each of the previously described clients and the rules extension service may be implemented in one or more electronic devices 700. In one implementation: 1) each of the clients is implemented in a separate one of the electronic devices 700 (e.g., in end user devices where the software 728 represents the software to implement clients to interface directly and/or indirectly with the rules extension service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the rules extension service is implemented in a separate set of one or more of the electronic devices 700 (e.g., a set of one or more server devices where the software 728 represents the software to implement the rules extension service); and 3) in operation, the electronic devices implementing the clients and the rules extension service would be communicatively coupled (e.g., by a network) and would establish between them (or through one or more other layers and/or or other services) connections for submitting extension rules (which in various exemplary implementations may be defined with respect to a tenant data repository in a tenant context private to the tenant) to the rules extension service and returning an execution context to the clients (which in various exemplary implementations may be based at least in part on executing a standard rule defined with respect to a shared data repository contemporaneously with a corresponding extension rule). Other configurations of electronic devices may be used in other implementations (e.g., an implementation in which the client and the rules extension service are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Figure 7B:
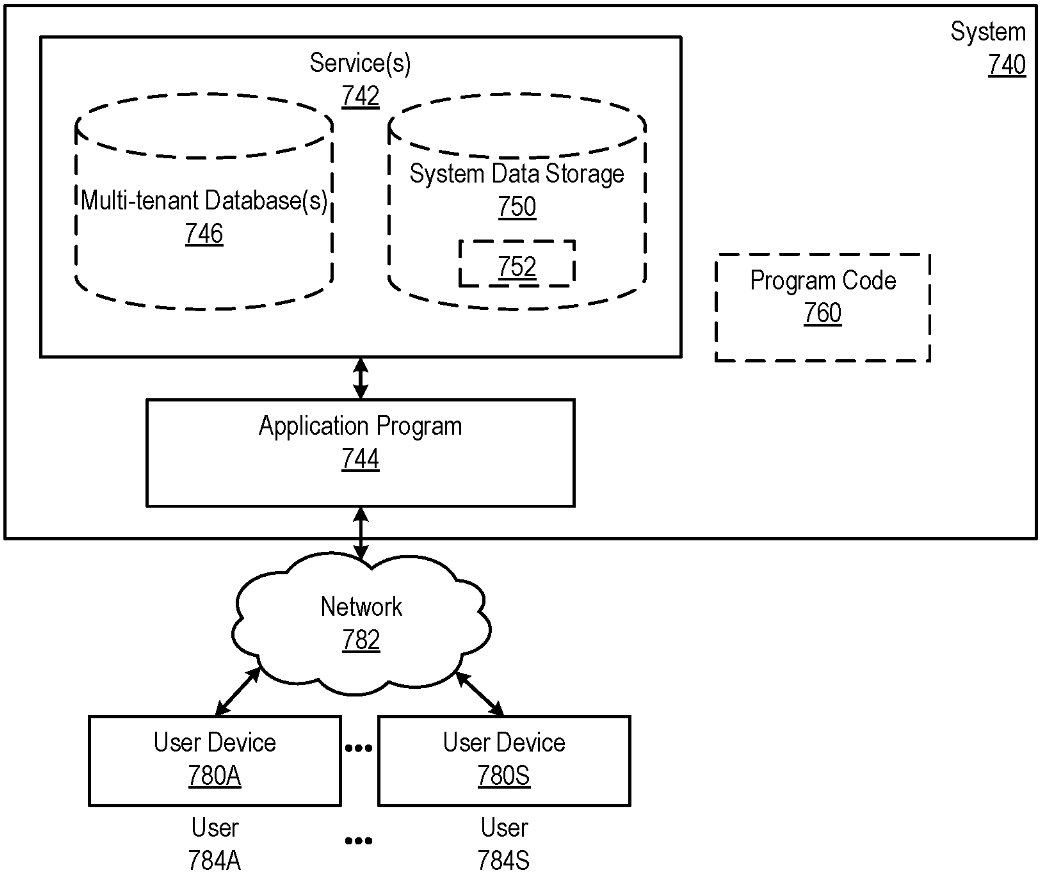
FIG. 7B is a block diagram of a deployment environment according to some example implementations.

FIG. 7B is a block diagram of a deployment environment according to some example implementations. A system 740 includes hardware (e.g., a set of one or more server devices) and software to provide service(s) 742, including the rules extension service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. For example, as discussed above, there may be data access and/or data contexts that are shared among tenants to provide common access to the tenants, as well as private data contexts unique to one or selected ones of the tenants. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. It will be appreciated each of the tenancy environments may represent one or more data context with possibly overlapping data access to facilitate, for example, a rules engine to provide standard rules in a shared data repository accessible by multiple tenants, where the rules engine may access extension rules stored in a tenant context private to a tenant.

In one implementation, the system 740 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the rules extension service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS) (or other distributed file system), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A system to provide a multi-tenant database accessible by multiple tenants with shared access rights, the system comprising:

one or more processors; and a non-transitory machine-readable storage medium that provides instructions that, if executed by one or a combination of the processors, are configurable to cause the system to perform operations comprising:

accessing, from the multi-tenant database, a first standard rule that identifies operations to perform, has an associated first extension point, and may be seen by the multiple tenants;

accessing, based on the first extension point, a first extension rule from a first tenant context that is accessible by one and not the others of the multiple tenants, wherein the first extension rule defines a first tenant controlled extension to customize performance of the first standard rule for the one of the multiple tenants based on data from the first tenant context;

executing both the first standard rule and the first extension rule, wherein the first extension rule is executed by a rules engine; and when it was determined to temporarily save state information related to the executing, saving the state information for later use to enable stateful rule execution by the rules engine.

2. The system of claim 1, the operations further comprising:

executing, during a subsequent execution of rules by the rules engine, the first extension rule only if the state information was not saved or is no longer current for a fact object for the first extension rule, otherwise avoiding the executing the first extension rule during the subsequent execution.

3. The system of claim 1, the operations further comprising:

before the executing, synchronizing data from a first database object to a first fact object, wherein the first database object is of the database and is associated with the first standard rule, wherein the first fact object is for the rules engine and is associated with the first extension rule; and synchronizing data from the first fact object to the first database object because the first fact object was modified by the executing of the first extension rule.

4. The system of claim 3, the operations further comprising:

before the executing, creating an event listener to at least listen for an event that indicates execution of the first extension rule; and performing the synchronizing from the first fact object to the first database object responsive to the event listener detecting the event rather than waiting until execution of other rules by the rules engine has been completed.

5. The system of claim 3, the operations further comprising:

a second synchronizing of data from the first database object to the first fact object only if the state information was not saved or is no longer current for the first fact object, otherwise avoiding the second synchronizing of data from the first database object to the first fact object; and a second executing of the first extension rule only if the second synchronizing of data from the first database object to the first fact object was performed, otherwise avoiding the second executing.

6. The system of claim 5, the operations further comprising:

creating an event listener to at least listen for an event that indicates execution of the first extension rule; and a second synchronizing of data, without waiting for execution of other rules by the rules engine, from the first fact object to the first database object only if the second executing was performed.

7. The system of claim 1, the operations further comprising:

accessing, from the multi-tenant database, a second standard rule that identifies operations to perform, has an associated second extension point, and may be seen by the multiple tenants;

accessing, based on the second extension point, a second extension rule from the first tenant context that is accessible by one and not the others of the multiple tenants, wherein the second extension rule defines a controlled extension to customize performance of the second standard rule for the one of the multiple tenants based on data from the first tenant context;

generating, when it is determined that a fact object for the rules engine does not already exist for a fact from a second database object based on a map, a second fact object based on a translation of the second database object and updating a map with a handle for the second fact object;

updating, when it is determined that the second fact object already exists and the fact from the second database object is not the same as a fact in the second fact object, the fact in the second fact object to match the fact from the second database object;

executing the second extension rule when the generating or updating was performed, otherwise avoiding executing the second extension rule when it is determined that the second fact object already exists and the fact from the second database object is the same as the fact in the second fact object; and translating, when the second extension rule was executed, a modification to the second fact object into a corresponding change to the second database object.

8. The system of claim 1, the operations further comprising:

creating an event listener to at least listen for an event that indicates execution of the first extension rule, wherein the first standard rule has an associated first database object, and wherein the first extension rule has an associated first fact object corresponding to the first database object, wherein the executing the first extension rule causes the event;

modifying the first fact object as part of the executing of the first extension rule; and translating, by the event listener responsive to the event, the modification to the first fact object into a corresponding change to the first database object.

9. The system of claim 8, the operations further comprising:

configuring the event listener as an asynchronous event listener, wherein the event is an asynchronous event.

10. The system of claim 1, wherein the executing comprises:

modifying a first result of the first standard rule based at least in part on the first extension rule.

11. A method, performed by one or a combination of electronic devices, to provide a multi-tenant database accessible by multiple tenants with shared access rights, the method comprising:

accessing, from the multi-tenant database, a first standard rule that identifies operations to perform, has an associated first extension point, and may be seen by the multiple tenants;

accessing, based on the first extension point, a first extension rule from a first tenant context that is accessible by one and not the others of the multiple tenants, wherein the first extension rule defines a first tenant controlled extension to customize performance of the first standard rule for the one of the multiple tenants based on data from the first tenant context;

executing both the first standard rule and the first extension rule, wherein the first extension rule is executed by a rules engine; and when it was determined to temporarily save state information related to the executing, saving the state information for later use to enable stateful rule execution by the rules engine.

12. The method of claim 11 further comprising:

executing, during a subsequent execution of rules by the rules engine, the first extension rule only if the state information was not saved or is no longer current for a fact object for the first extension rule, otherwise avoiding the executing the first extension rule during the subsequent execution.

13. The method of claim 11 further comprising:

before the executing, synchronizing data from a first database object to a first fact object, wherein the first database object is of the database and is associated with the first standard rule, wherein the first fact object is for the rules engine and is associated with the first extension rule; and synchronizing data from the first fact object to the first database object because the first fact object was modified by the executing of the first extension rule.

14. The method of claim 13 further comprising:

before the executing, creating an event listener to at least listen for an event that indicates execution of the first extension rule; and performing the synchronizing from the first fact object to the first database object responsive to the event listener detecting the event rather than waiting until execution of other rules by the rules engine has been completed.

15. The method of claim 13 further comprising:

a second synchronizing of data from the first database object to the first fact object only if the state information was not saved or is no longer current for the first fact object, otherwise avoiding the second synchronizing of data from the first database object to the first fact object; and a second executing of the first extension rule only if the second synchronizing of data from the first database object to the first fact object was performed, otherwise avoiding the second executing.

16. The method of claim 15 further comprising:

creating an event listener to at least listen for an event that indicates execution of the first extension rule; and a second synchronizing of data from the first fact object to the first database object only if the second executing was performed and without waiting for execution of other rules by the rules engine.

17. The method of claim 11 further comprising:

accessing, from the multi-tenant database, a second standard rule that identifies operations to perform, has an associated second extension point, and may be seen by the multiple tenants;

accessing, based on the second extension point, a second extension rule from the first tenant context that is accessible by one and not the others of the multiple tenants, wherein the second extension rule defines a controlled extension to customize performance of the second standard rule for the one of the multiple tenants based on data from the first tenant context;

generating, when it is determined that a fact object for the rules engine does not already exist for a fact from a second database object based on a map, a second fact object based on a translation of the second database object and updating a map with a handle for the second fact object;

updating, when it is determined that the second fact object already exists and the fact from the second database object is not the same as a fact in the second fact object, the fact in the second fact object to match the fact from the second database object;

executing the second extension rule when the generating or updating was performed, otherwise avoiding executing the second extension rule when it is determined that the second fact object already exists and the fact from the second database object is the same as the fact in the second fact object; and translating, when the second extension rule was executed, a modification to the second fact object into a corresponding change to the second database object.

18. The method of claim 11 further comprising:

creating an event listener to at least listen for an event that indicates execution of the first extension rule, wherein the first standard rule has an associated first database object, and wherein the first extension rule has an associated first fact object corresponding to the first database object, wherein the executing the first extension rule causes the event;

modifying the first fact object as part of the executing of the first extension rule; and translating, by the event listener responsive to the event, the modification to the first fact object into a corresponding change to the first database object.

19. The method of claim 18 further comprising:

configuring the event listener as an asynchronous event listener, wherein the event is an asynchronous event.

20. The method of claim 11, wherein the executing comprises:

modifying a first result of the first standard rule based at least in part on the first extension rule.

* * * * *